United States Patent [19]

McGuire

[11] Patent Number: 4,745,352

[45] Date of Patent: May 17, 1988

[54] SWITCHING AC VOLTAGE REGULATOR

[75] Inventor: Thomas B. McGuire, San Diego, Calif.

[73] Assignee: Topaz, Inc., San Diego, Calif.

[21] Appl. No.: 59,089

[22] Filed: Jun. 8, 1987

[51] Int. Cl.[4] .............................................. G05F 1/26
[52] U.S. Cl. .................................... 323/263; 323/344
[58] Field of Search ............... 323/222, 223, 225, 259, 323/263, 271, 272, 344, 345, 346, 901

[56] References Cited

U.S. PATENT DOCUMENTS

| | | | |
|---|---|---|---|
| 3,295,053 | 12/1966 | Perrins | 323/263 |
| 3,596,172 | 7/1971 | Harrison | 323/263 |
| 3,944,909 | 3/1976 | Reymond | 323/263 |

*Primary Examiner*—Peter S. Wong
*Attorney, Agent, or Firm*—R. T. Guttman; M. J. Femal; Mary Jankowsky

[57] ABSTRACT

A switching AC voltage regulator including a transformer, two solid state AC switches, and sensing means controlling the switches to produce the desired output voltage. The two switches conduct alternately and are switched at a rate much higher than the frequency of the regulated AC voltage. When the first switch is activated, the transformer is shorted out, causing the output of the transformer to equal the input. When the second switch is activated, normal transformer action occurs, creating an output voltage either higher or lower than the input, depending on the transformer arrangement. The duty cycle of the switches is varied to provide precise control of the output voltage.

20 Claims, 5 Drawing Sheets

TIMING DIAGRAM

SWITCHING AC VOLTAGE REGULATOR

FIELD OF THE INVENTION

This invention relates to AC voltage regulators and is more particularly directed to highly efficient regulators having a continuously variable and precise voltage control.

The regulator that is the subject of this application first was first designed to save electric power and reduce electric utility bills. Power supplied by utility companies is usually provided at a nominal voltage, plus or minus five percent on a long term average. Short term deviations may be as great as plus or minus ten percent of the nominal voltage.

Most electrical equipment is designed to operate over a range of ten percent over the nominal voltage to twelve to fifteen percent under the nominal voltage. The additional tolerance for low voltage is required to accommodate voltage drops that occur in building wiring between the utility entrance and the equipment.

If the electrical power supplied by the utility company is closely regulated to a constant voltage at the utility entrance or at major distribution points within the user's facility, the voltage can be controlled at the minus ten percent level to reduce the power consumed. A voltage level of minus seven or eight percent could be used to provide some safety margin if needed. This adjustment may be made by the individual user to suit the specific need.

Many additional benefits are realized by operating electrical equipment at seven to ten percent below its nominally rated voltage. Virtually everything runs cooler and lasts longer.

To obtain the maximum benefit in energy savings, the regulating equipment itself must be highly efficient. Given the present efficiency of commercial transformers and semiconductor switches, an efficiency rate greater than 99% can be achieved with the present invention, making it a cost effective method of reducing utility bills.

In addition to the above described use, the present invention may also be used to condition the input power to computer systems or other critical equipment by reducing transverse mode noise as well as providing accurately regulated voltage. Additionally, with appropriate control connections, the input and output terminals of the regulator may be interchanged. Thus the configuration of the regulator may be modified to produce an output voltage higher than its input voltage.

Prior methods of regulating AC voltage are not suitable for the energy conservation application discussed above. Ferroresonant and other saturated magnetics types of regulators are too inefficient. Electro-mechanical tap switching regulators and variable transformer regulators respond too slowly. Phase controlled SCR regulators introduce too much distortion for general use. Electronic tap switching regulators respond quickly but their regulation is not very accurate (plus or minus five percent to plus or minus seven percent).

There is a need for an accurate, efficient AC voltage regulator with low distortion. The present invention meets these requirements.

SUMMARY OF THE INVENTION

The preferred embodiment of the subject invention described herein includes an autotransformer 14 electrically connected to a load and to two switches 16 and 17. Each switch has positions 1 and 2, as symbolically shown in FIG. 2. With the switches in position 1, an input voltage across input leads 12 and 13 will yield an output reduced in voltage across output leads 18 and 20. For example, with the switches in position 1, an input of 126 volts across input leads 12 and 13 would yield an output of 110 volts across output leads 18 and 20. With the switches in position 2, an input of 110 volts yields an output of 110 volts. For any input voltage between 126 volts and 110 volts, the output is maintained at 110 volts by varying the length of time the switches are in each position. The switches alternate between positions 1 at 2 at a high frequency, such as 20 Khz. The operation of the switches is regulated by a control circuit 22 that compares the output of the voltage regulator to the desired voltage and produces a pulse width modulated (PWM) control signal to alternate the position of the switches.

DESCRIPTION OF THE PREFERRED EMBODIMENT

Figure 2:
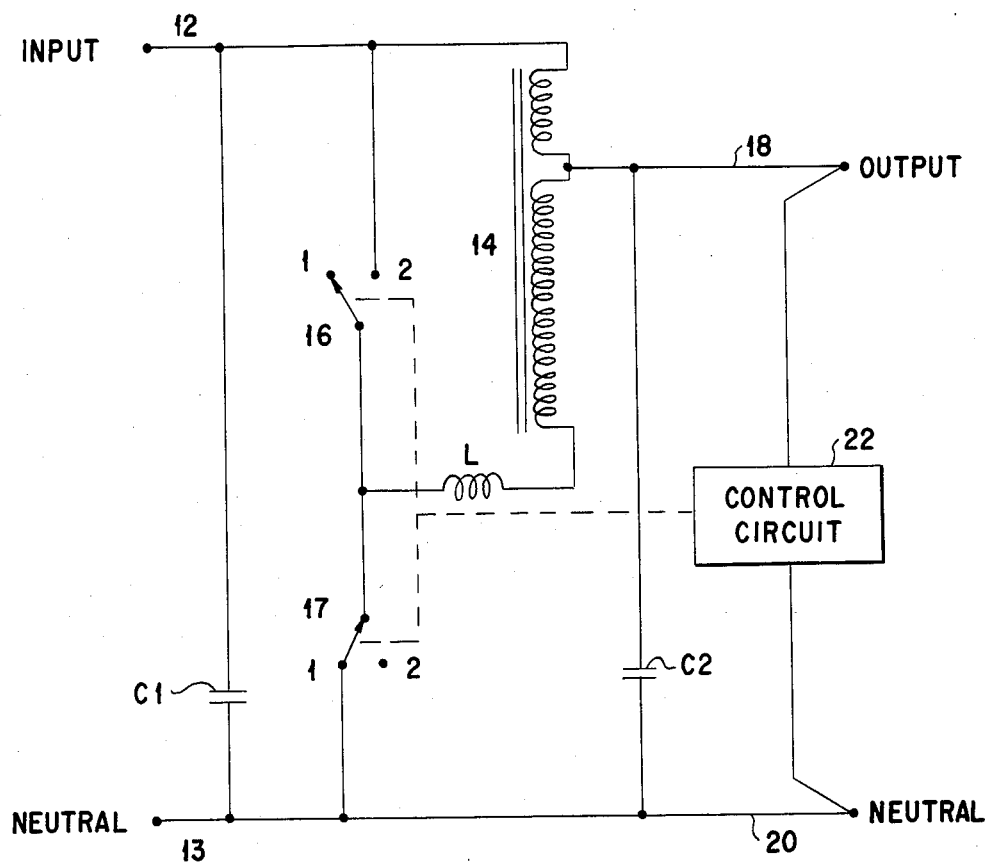
FIG. 2 is a symbolic schematic diagram of the preferred embodiment.

Referring to FIG. 2, the voltage regulator that is the subject of this invention is shown in symbolic form. The input voltage is applied to the regulator via input leads 12 and 13. The path of current through the autotransformer 14 is determined by the position of two switches, indicated as numerals 16 and 17. When the switches are in position 1 as shown in FIG. 2, the output voltage across leads 18 and 20 will be less than the input voltage by a percentage that depends on the turns ratio of the autotransformer 14.

The voltage regulator can be adjusted in a manner that will be described later, to produce any desired output voltage within a given range. By way of example, again referring to FIG. 2, we will assume that 110 volts has been selected as the desired output voltage and that the transformer ratio is such that when the switches 16 and 17 are in position 1, the output will be 110 volts for an input of 126 volts. With the switches 16 and 17 in position 2, an input voltage of 110 volts produces an output voltage of 110 volts. For an input voltage between 126 volts and 110 volts, switches 16 and 17 will alternate between position 1 and position 2 as is necessary to provide an output of 110 volts.

To produce the desired output voltage in the regulators shown in FIGS. 2-5, control circuit 22 regulates the length of time the switches 16 and 17 are in each position. The switches of the preferred embodiment operate at a high frequency, typically 20 khz.

DESCRIPTION OF THE CONTROL CIRCUIT

Figure 1:
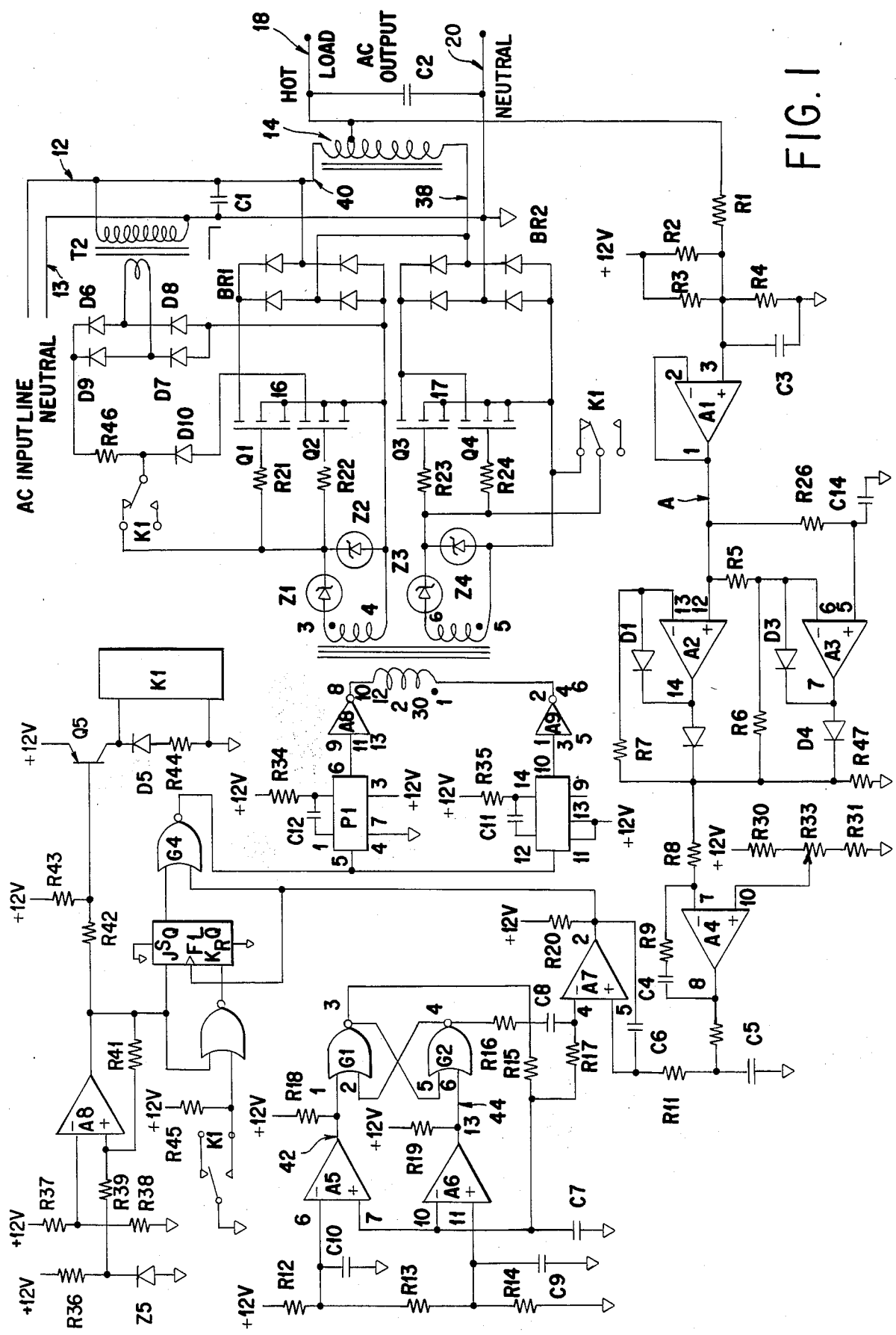
FIG. 1 is a circuit diagram of the AC switching voltage regulator that is the preferred embodiment of the present invention.

The autotransformer 14, switches 16 and 17, and the control circuit 22 of FIG. 2 are components of the regulator as shown in the electrical schematic of FIG. 1.

The regulator has an input lead 12 and neutral input lead 13. The voltage applied across leads 12 and 13 is filtered by capacitor C1. The two switches 16 and 17, each comprising a bridge rectifier and two parallel connected field effect transistors (FETs), are operated to change the primary connection of the transformer 14. The control circuit is designed so that the switches 16 and 17 may only be energized alternately. In the preferred embodiment these switches are turned on and off at 20 Khz, with the switches remaining in the OFF state and the ON state for the length of time necessary to produce the desired output voltage. With an input voltage of 110 volts and a desired output of 110 volts, switch 16 of FIG. 2 will be activated constantly. The switches would be in position 2 as shown in the schematic of FIG. 2. With an input voltage of 126 volts and a desired output of 110 volts, switch 17 will be activated constantly. In the schematic shown in FIG. 2 the switches would be in position 1. For the purposes of discussion, we will assume here that the desired output is 110 volts and that the regulator is as shown in FIG. 2, unless otherwise specified. The output voltage can be varied, as will be described later.

For an input voltage of 118 volts and a desired output voltage of 110 volts, each switch will remain in the OFF state approximately one-half of the time and in the ON state approximately one-half of the time. The capacitor C2 connected between output leads 18 and 20 in conjunction with the leakage inductance between the two sections of the transformer winding (shown symbolically as L in FIG. 2) smooth the output voltage to produce an average voltage of 110 volts as a undistorted sine wave.

The output lead 18 is also concurrently connected to a voltage follower circuit 50, comprising resistors R1, R2, R3, R4, capacitor C3 and amplifier A1. The output lead 18 is connected to resistor R1. Resistors R2 and R3 are connected in parallel between a 12 volt power supply and the second side of resistor R1. Resistor R4 and capacitor C3 are connected in parallel between the second side of resistor R1 and ground. Resistors R1, R2, R3 and R4 form a voltage divider that reduces the 110 volt output across leads 18 and 20 to a 2.4 volt AC signal with a 6 volt DC bias which is supplied to the noninverting input of amplifier A1.

The inverting input of amplifier A1 is fed by the amplifier A1 output. The output voltage of amplifier A1 is equal to the voltage applied to its noninverting input, but at a lower impedance. The output of amplifier A1 (at point A) supplies a 2.4 AC signal with a 6 volt DC bias to a biased absolute value circuit which produces an output equal to the sum of the DC bias and the absolute value of the instantaneous value of the AC signal.

The absolute value circuit 52 comprises amplifiers A2 and A3 and the associated resistors, diodes and capacitor, as discussed below.

The output of comparator A1 is supplied both to the inverting input of comparator A3 via resistor R5 and to the noninverting input of comparator A2. The inverting input of comparator A2 is fed through resistor R7 by the output of comparator A3 via forward biased diode D4. Diode D1 is connected between the output and inverting input of comparator A2 to clamp comparator A2 to avoid saturation when the signal at point A is negative. When the signal at point A is positive, the output of comparator A2 is positive and is connected to the output of the absolute value circuit 52.

A similar group of components, diodes D3 and D4, and resistor R6, controls the voltage output of comparator A3. Gating diode D3 is connected between the output and inverting input of comparator A3 to limit the error introduced to comparator A3. Forward biasing diode D4 connects the positive output of comparator A3, occurring when the signal at point A is negative, to the output of the absolute value circuit 52. Resistor R6 is connected between the inverting input of comparator A3 and the output of the circuit 52. Resistor R26 and capacitor C14 are serially connected between point A, the input to the absolute value circuit, and ground. The noninverting input of comparator A3 is connected to the juncture between resistor R26 and capacitor C14.

By way of example, we will assume the DC bias at the output of buffer amplifier A1 is 6 volts and that the instantaneous value of the AC signal is +2 volts. The voltage at the input to the absolute value circuit is 6+2=8 volts. The voltage at the noninverting input to amplifier A3 will equal the 6 volt bias. Under these conditions diodes D2 and D3 will conduct, diodes D1 and D4 will not conduct and amplifier A2 will drive the output to 8 volts. Assume now that the instantaneous value of the AC wave is −2 volts. The voltage at the input to the absolute value circuit is 6−2=4 volts. The voltage at the noninverting input to amplifier A3 will equal the 6 volt bias. Under these conditions diodes D1 and D4 will conduct, diodes D2 and D3 will not conduct and amplifier A3 will drive the output to 8 volts.

The absolute value circuit 52 rectifies the sign wave input without producing the voltage drop usually experienced across diodes. The output of the absolute value circuit 52 is fed to the error amplifier 54, consisting of amplifier A4, resistors R8, R9, R10 and R11, and capacitors C4 and C5.

The output of the absolute value circuit 52 is supplied through resistor R8 to the inverting input of amplifier A4. Capacitor C4 and resistor R9 are connected in series in the feedback loop between the output and inverting input of amplifier A4. These two components provide stability in the operation of the overall high gain closed loop regulator system. The noninverting input of amplifier A4 is supplied a DC reference voltage by potentiometer R33. Potentiometer R33 is connected in series between resistors R30 and R31, with the entire assembly being connected between a 12 volt power supply and ground. The setting of potentiometer R33 determines the output voltage of the regulator established across output leads 18 and 20. Although in the preferred embodiment this voltage is assumed to be set for 110 volts, the desired output voltage may be varied over a wide range by varying the potentiometer setting.

The output of amplifier A4 is connected through a resistor R10 to a connection between a grounded capacitor C5 and a resistor R11. The negative feedback loop of capacitor C4 and resistor R9 combined with resistor R10 and capacitor C5 low pass filter the output of amplifier A4 to a steady DC voltage with a slight ripple. The output of amplifier A4 varies inversely as the difference between the regulator output voltage between leads 18 and 20, and the desired output voltage, as determined by the setting of potentiometer R33. As the regulator's output voltage increases, amplifier A4's output decreases.

The other side of resistor R11 is connected to the noninverting input of comparator A7. Capacitor C6 is in the feedback loop between the output and noninverting input of comparator A7. The inverting input of comparator A7 is supplied by a triangle wave generator 26.

The triangle wave generator 26 includes two comparators A5 and A6, the output of each being connected to an input of a NOR gate, G1 or G2, respectively. The NOR gates, G1 and G2, are interconnected forming a type R-S flip-flop. A voltage divider, consisting of resistors R12, R13, and R14 is connected between a 12 volt power supply and ground to provide a constant DC reference voltage of 9 volts to the inverting input of comparator A5 and a reference voltage of 3 volts to the noninverting input of comparator A6. The noninverting input of comparator A5 and the inverting input of comparator A6 are connected concurrently to receive the triangle wave generated on grounded capacitor C7.

The inverting input to comparator A5 and the noninverting input to comparator A6 are held constant by grounded capacitors C10 and C9, respectively. The outputs of comparators A5 and A6 appear on respective leads 42 and 44 which are each connected to the 12 volt power supply via pull up resistors R18 and R19, respectively, to provide sufficient drive for NOR gates G1 and G2.

When the triangle wave voltage on capacitor C7 exceeds the 9 volts established at the inverting input of comparator A5, the output of comparator A5 goes high. The output of gate G1 then goes low and capacitor C7 begins discharging via resistor R15 connected from the output of gate G1 to capacitor C7. When the voltage across capacitor C7 discharges to 3 volts, the output of comparator A6 goes high, causing the flip flop to return to its original state and again charge capacitor C7 via resistor R15, completing a cycle of the triangle wave.

The output of gate G2 is connected serially through resistor R16 and capacitor C8 to the inverting input of comparator A7. Resistor R17 connects the triangle wave generated at capacitor C7 to the inverting input of comparator A7, the pulse width modulator.

Comparator A7, the pulse width modulator, compares the output of the error amplifier 54 to the triangle wave generated on capacitor C7. The output of the pulse width modulator is a square wave. Its duty cycle is determined by the output of the error amplifier 54. If the regulator output voltage is too low, a wider duty cycle will be generated. If the regulator output voltage is too high, a narrower duty cycle will be generated. This signal controls, via starting circuit 60, pulse generators P1 and P2, buffers A8 and A9, and driver transformer 28, the conduction of main power switches 16 and 17. When the output of the pulse width modulator is high, switch 17 will be turned on. When its output is low, switch 16 will be turned on.

Resistors R16 and R17 and capacitor C8 put a spike at each peak and valley of the triangle wave to insure that the output of comparator A7 changes states twice each cycle of the triangle wave generator even if the error amplifier is saturated. This is necessary to recharge the gate input capacitance of the capacitors of the transistors Q1 through Q4 every 50 microseconds, as will be discussed later, so that these transistors do not drift into a semiconducting state. The preferred embodiment of the present invention utilizes components that produce a triangle wave form with an oscillating frequency of 20 Khz.

The output of comparator A7 is a square wave having a varied duty cycle depending on the feed back error voltage at its noninverting input. When the output voltage of the triangle generator 26 is less than the output voltage of the error amplifier 24, the output of comparator A7 is high. The square wave output alternates between approximately 0 volts and approximately 12 volts. The output of comparator A7 is connected through pull up resistor R20 to a 12 volt power supply and is supplied to a starting circuit 60.

Starting circuit or starter 60 comprising comparator A8, transistor Q5, relay K1, NOR gates G3 and G4, flip flop F1, transformer T2, diodes D5, D6, D7, D8, D9, D10, Z5, and resistors R36, R37, R38, R39, R41, R42, R43, R44, R45, R46, monitors the 12 volt power supply and provides appropriate control signals for switches 16 and 17. When the power supply voltage is too low, K1 will be off, turning switch 16 on and switch 17 off. When the supply voltage is normal K1 will be on and the pulse width modulator will control the switches.

When the output of the 12 volt power supply is less than 10 volts, the output of comparator A8 will be a logical high. When the output of the 12 volt power supply is greater than 11 volts, the output of comparator A8 will be a logical low.

When the output of comparator A8 is a logical low, the power supply voltage is adequate for proper operation and relay K1 is energized by transistor Q5. The series connection of diode D5 and resistor R44 connected in parallel with the coil terminals of relay K1 provide a means for safely dissipating the stored energy in the coil of relay K1 when transistor Q5 turns off there by protecting transistor Q5.

Three sets of contacts of relay K1 are used in the present invention. The normally closed contact of the first set of contacts is connected to the gate terminal of transistors Q1 and Q2 via resistors R21 and R22, respectively. The armature contact of the first set of Q1 and Q2 via diode D10. Additionally the armature contact of the first set of contacts is connected to the positive terminal of the bridge rectifier BR3 comprising diodes D6, D7, D8 and D9 via current limiting resistor R46. The negative terminal of the bridge rectifier BR3 is connected to the source terminal of transistors Q1 and Q2. The AC terminals of the bridge rectifier BR3 are connected to and driven by the secondary coil of transformer T2. The primary coil of transformer T2 is connected between the input terminal 40 of transformer 14 and circuit common lead 13. These connections provide a means to turn transistors Q1 and Q2 on when the 12 volt power supply is low and K1 is de-energized.

The armature contact of the second set of contacts of relay K1 is connected to the gate terminal of transistors Q3 and Q4 via resistors R23 and R24, respectively. The normally closed contact of the second set of contacts of relay K1 is connected to the source terminal of transistors Q3 and Q4. These connections provide a means of inhibiting transistors Q3 and Q4 from conducting when the 12 volt power supply is low and K1 is de-energized.

The armature contact of the third set of contacts of relay K1 is grounded. The normally open contact of the third set of contacts is connected to the first input terminal of NOR gate G3. The first input terminal of NOR gate G3 is additionally connected to the 12 volt power supply via pull up resistor R45. The second input terminal of NOR gate G3 and additionally the J input terminal of flip flop F1 are connected to and driven by the output terminal of comparator A8. The K input terminal of flip flop F1 is connected to and driven by the output terminal of NOR gate G3. The R and S input terminals of flip flop F1 are grounded. The clock input terminal of flip flop F1 and additionally the first input terminal of NOR gate G4 are connected to and driven by the pulse width modulator signal at the output terminal of comparator A7. The Q output terminal of flip flop F1 is connected to and drives the second input terminal of NOR gate G4. The output of NOR gate G4 is connected to and drives monostable pulse generators P1 and P2. These connections provide a means for orderly transition of control of switches 16 and 17 between that provided by the first two sets of contacts of relay K1 and that provided by the pulse width modulator. Relay K1 controls the drive to switches 16 and 17 during system start up and periods of low power supply voltage. The pulse width modulator controls the drive to switches 16 and 17 during normal operation.

The period of pulse generators P1 and P2 is set to 2 microseconds by C12, R34 and C11, R35, respectively.

The outputs of pulse generators P1 and P2 are each connected through respective inverters A8 and A9 to opposite sides of primary winding 30 of the pulse transformer 28. Upon either of pulse generators P1 or P2 being activated, that pulse generator produces a 2 microsecond positive voltage pulse. At all other times the outputs of the pulse generators P1 and P2 are at ground potential. When both outputs of the pulse generators P1 and P2 are at zero, the outputs of both inverters A8 and A9 are at 12 volts, creating a zero potential differential across the primary winding 30. At this time, no current flows through the pulse transformer 28. When one of the pulse generators, for example P2, emits a positive voltage 2 microsecond pulse, the output of the associated inverter, here A9, goes low to induce a negative voltage pulse across the primary winding 30.

The pulse transformer 28 has two secondary windings 32 and 34. Each of the two secondary windings 32 and 34 are connected to similar circuits to control the energization of switches 16 and 17, respectively. A positive voltage pulse at the start terminal of secondary winding 32 charges the input capacitance of transistors Q1 and Q2 turning the transistors on. Zener diode Z2 limits the gate voltage. The transistors remain on until a negative voltage pulse at the start terminal of secondary winding 32 of sufficient amplitude to cause zener diode Z1 to conduct discharges the input capacitance of the transistors turning the transistors off.

Secondary winding 34 drives transistors Q3 and Q4 in a similar manner except that the winding polarity is reversed with respect to secondary winding 32. Thus a primary pulse of either polarity will always turn one switch on and the other off.

The start terminal of secondary winding 32 is connected through zener diode Z1 and transistors R21 and R22 to the respective gates of field effect transistors Q1 and Q2. Zener diode Z2 is connected from the cathode of zener diode Z1 to the source terminals of transistors Q1 and Q2. The finish terminal of secondary winding 32 is connected to the source terminals of transistors Q1 and Q2. The source terminals of transistors Q1 and Q2 are also connected to the negative terminal of bridge rectifier BR1 while the drain terminals of transistors Q1 and Q2 are connected to the positive terminal of bridge rectifier BR1. One AC terminal of rectifier BR1 is connected to lead 40 of transformer 14. The other AC terminal is connected to lead 38 which is connected via inductor 40 to transformer 14.

Secondary coil 34 of transformer 28 is connected to switch 17 in a manner very similar to the connection of secondary coil 32 to switch 16, except with opposite polarity. The finish terminal of secondary coil 34 is connected through zener diode Z3 and resistors R23 and R24 to the respective gate terminals of field effect transistors Q3 and Q4. Zener diode Z4 is connected from the cathode of zener diode Z3 to the source terminals of transistors Q3 and Q4, and to the start terminal of secondary winding 34. The source terminals of transistors Q3 and Q4 are connected to the negative terminal of bridge rectifier BR2 while the drain terminals of transistors Q3 and Q4 are connected to the positive terminal of bridge rectifier BR2.

The polarities of the secondary windings 32 and 34 are such that a given pulse through the primary winding 30 will turn on only one set of switches, either transistors Q1 and Q2 or transistors Q3 and Q4. When transistors Q1 and Q2 are on the output voltage across leads 18 and 20 equals the input voltage across leads 12 and 13. When transistors Q3 and Q4 are on, transformer action in transformer 14 causes the output voltage to be less than the input voltage. The energization of transistors Q1 and Q2 is the equivalent of the switch 16 being in position 2 as shown in FIG. 2, while the energization of transistors Q3 and Q4 produces the effect of switch 17 in position 1 as shown in FIG. 2.

Figure 6:
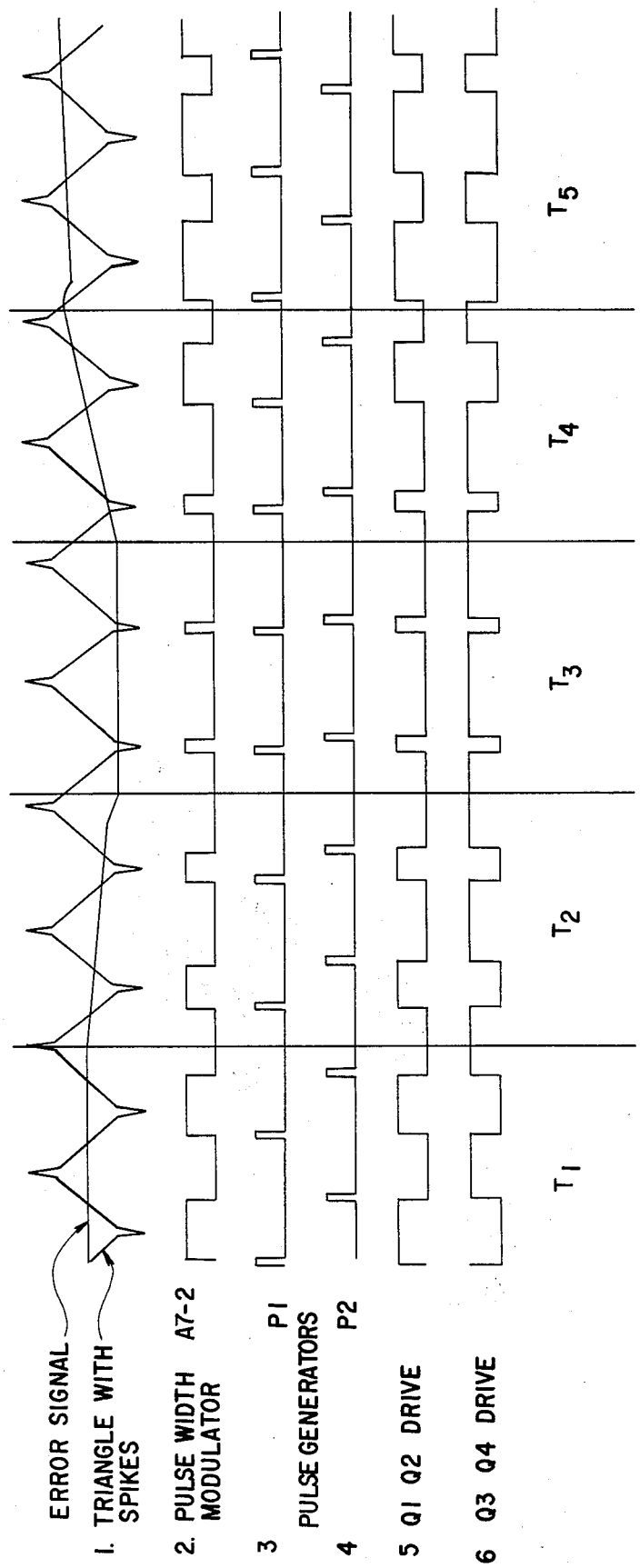
FIG. 6 is a timing diagram showing the time relation of some of the important signals.
Figure 7:
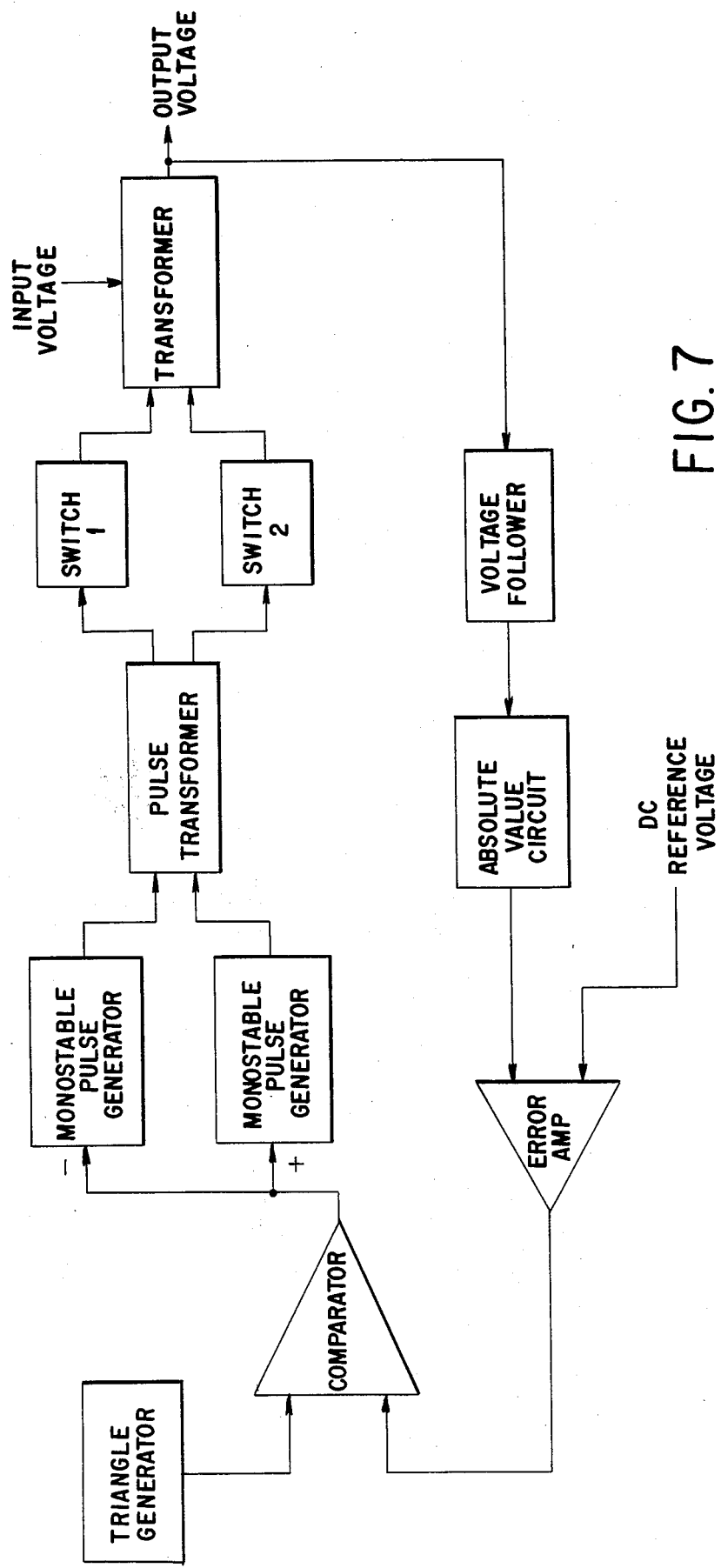
FIG. 7 is a block diagram of the voltage regulator.

FIG. 6 shows the time relation of some of the important signals of the regulator. Trace 1 is the error signal at A7-5 superimposed on the triangle wave with spikes at A7-4. Trace 2 is the pulse width modulator's output at A7-2. It is high when the error signal is more positive than the triangle wave. Traces 3 and 4 are the outputs of pulse generators P1 and P2, P1 produces a pulse when the pulse width modulator output rises. P2 produces a pulse when the pulse width modulator output falls. Traces 5 and 6 are the drive signals for the main power switches. A high signal turns a switch on and a low signal turns it off. A pulse at P1 charges the gates of Q1 and Q2 turning them on and discharges the gate of Q3 and Q4 turning them off. A pulse at P2 charges the gates of Q3 and Q4 turning them on and discharges the gate of Q1 and Q2 turning them off.

Time interval t1 represents a time of nominal input voltage. The duty cycle is approximately 50%. During t2 the AC voltage rises causing the error signal to fall. This results in more duty cycle for Q3 and Q4 and less for Q1 and Q2. The error amplifier is saturated during t3, but the spikes on the triangle wave cause the PWM to continue to operate, and keep the FET gates charged. The AC voltage falls during interval t4. The AC voltage is low during t5, resulting more duty cycle for Q1 and Q2 and less for Q3 and Q4.

The components used in the preferred embodiment of the invention described herein are indicated in the following list. It will be understood by those skilled in the art that the specific design herein described is limited to output power levels of less than 2kVA. It will also be understood by those skilled in the art that the maximum output power level may be increased to any practical level through the use of appropriate semiconductor switches and drive means.

| | |
|---|---|
| R1, R2 | 430 kohm |

-continued

| | |
|---|---|
| R3, R4, R5, R6 | 20 kohm |
| R7 | 10 kohm |
| R8 | 100 kohm |
| R9, R10, R11, R12 | 10 kohm |
| R13 | 20 kohm |
| R14, R15, R16 | 10 kohm |
| R17 | 7.5 kohm |
| R18, R19 | 10 kohm |
| R20 | 2 kohm |
| R21, R22, R23, R24 | 100 ohm |
| R26 | 100 kohm |
| R30 | 5.1 kohm |
| R31 | 15 kohm |
| R33 | 10 kohm |
| R34, R35 | 15 kohm |
| R36 | 750 ohm |
| R37 | 30 kohm |
| R38 | 43 kohm |
| R39 | 10 kohm |
| R41 | 180 kohm |
| R42, R43 | 10 kohm |
| R44 | 100 ohm |
| R45 | 10 kohm |
| R46 | 1 kohm |
| R47 | 10 kohm |
| C1, C2 | 7 uF |
| C3, C4 | 50 nF |
| C5 | 470 nF |
| C6 | 68 pf |
| C7 | 2.2 nF |
| C8 | 33 pf |
| C9, C10 | 10 nF |
| C11, C12 | 100 pF |
| C14 | 1.0 uF |
| Q1, Q2, Q3, Q4 | IRF730 |
| Q5 | 2N2907 |
| BR1, BR2 | PB40 |
| D1, D2, D3, D4 | 1N914 |
| D5, D6, D7, D8, D9 | 1N4005 |
| Z1, Z2, Z3, Z4 | 1N5240 |
| Z5 | 1N821 |
| A1, A2, A3, A4 | LM324 |
| A5, A6, A7, A8 | LM339 |
| G1, G2, G3, G4 | CD4001 |
| P1, P2 | CD4098 |
| A8, A9 | CD40106 |

The voltage regulator described above is capable of producing a controlled output voltage that is always equal to or less than the input voltage. By modifying the regulator as shown in FIG. 4, the output voltage will always be greater than or equal to the input voltage. Further modification as shown in FIGS. 3 or 5 allows the output voltage to vary both above and below the input voltage.

To regulate an input voltage that varies both above and below the desired output voltage, the voltage regulator of FIG. 2 is combined with step-up transformer 24 of FIG. 3. The step-up transformer 24 increases the input voltage to an intermediate level that is always above or equal to the desired output voltage. The voltage regulator of FIG. 2 then reduces the intermediate voltage to the desired output voltage in the manner described above.

The voltage regulator shown in FIG. 4 is identical to the regulator of FIG. 2 with the exception that the input and output terminals have been interchanged. The control system is connected to the output as in the regulator of FIG. 2. It operates in a manner similar to the voltage regulator of FIG. 2 except that the FIG. 4 regulator produces an output voltage that is higher than or equal to its input voltage.

Figure 3:
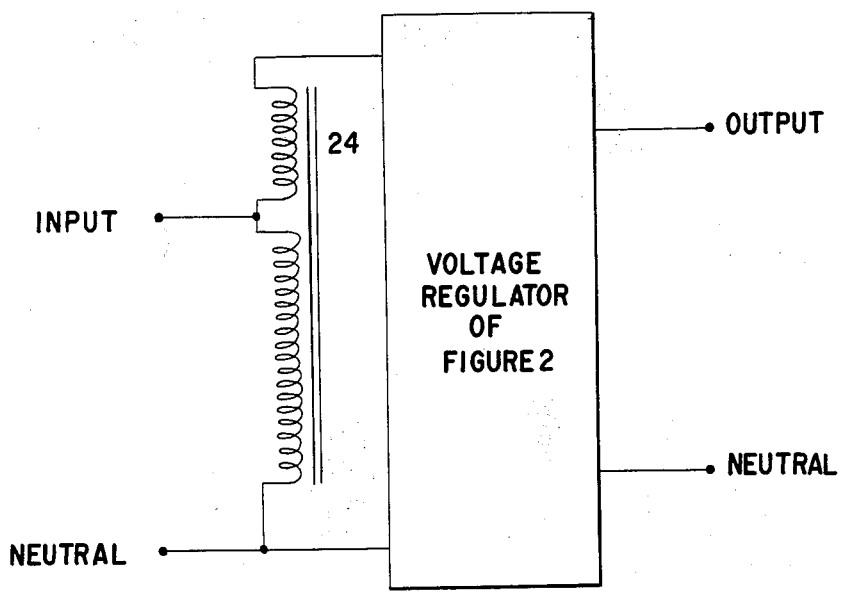
FIG. 3 is a schematic diagram of a voltage regulator comprised of the voltage regulator of FIG. 2 with the addition of an input transformer to pre-increase the input voltage.
Figure 4:
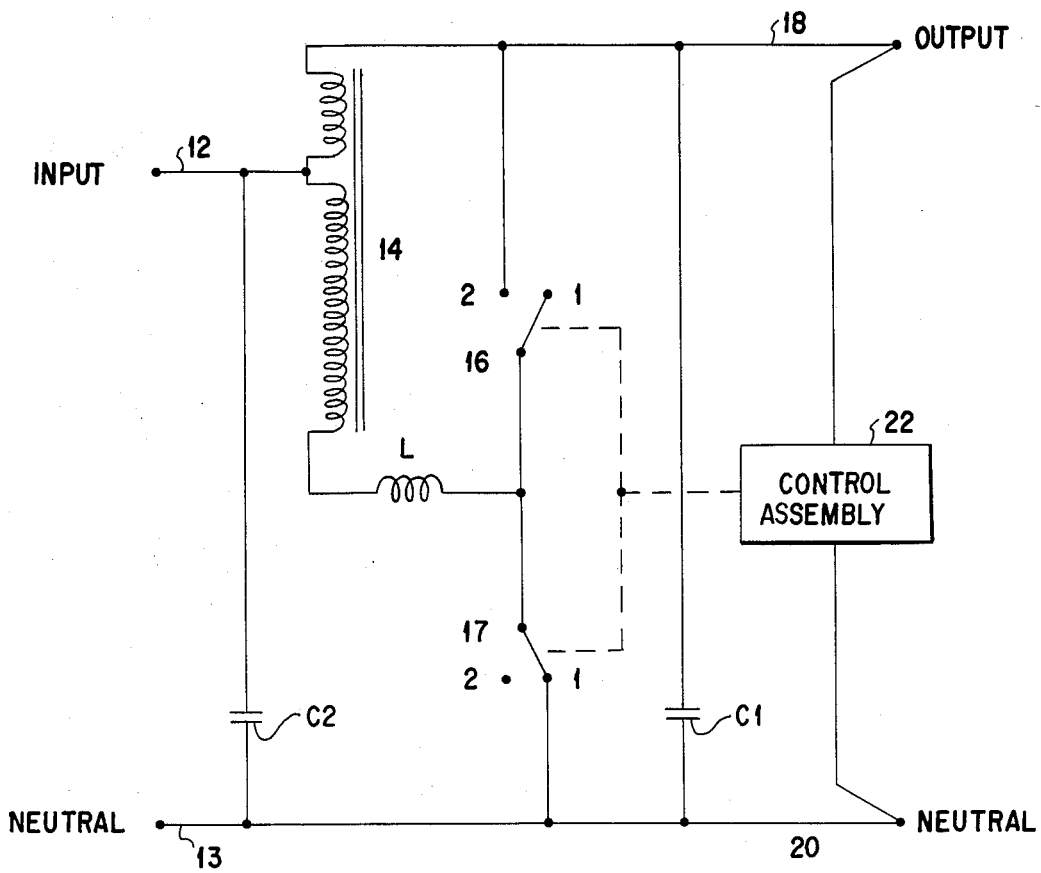
FIG. 4 is a symbolic schematic diagram of the preferred embodiment, with the input and output terminals interchanged to provide a voltage step up regulator.
Figure 5:
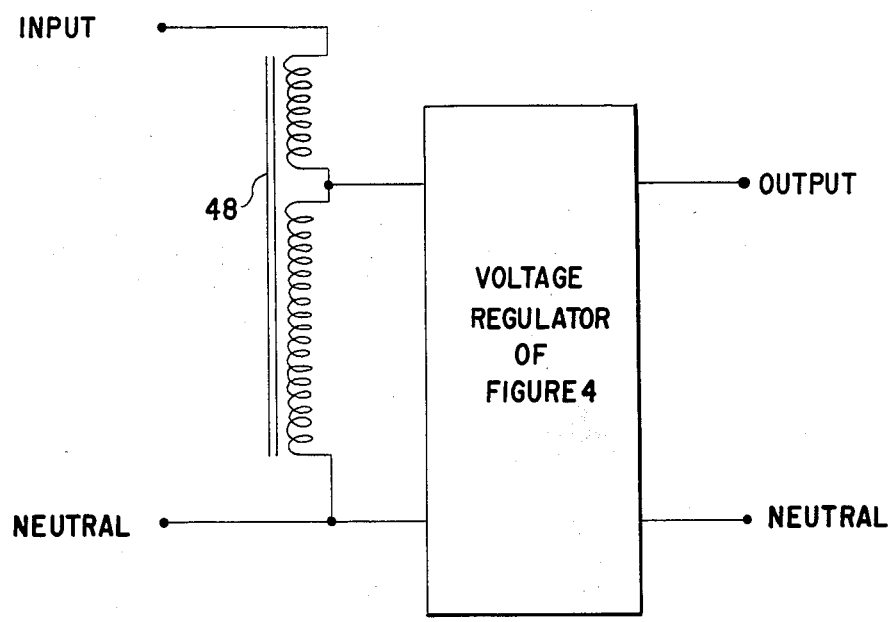
FIG. 5 is a schematic diagram of a voltage regulator comprised of the voltage regulator of FIG. 4 with the addition of an input transformer to pre-reduce the input voltage.

The voltage regulator of FIG. 5 is similar to the voltage regulator of FIG. 3. The step-up transformer of FIG. 3 is replaced with a step-down transformer 48. The step-down voltage regulator unit is replaced with the step-up voltage regulator unit of FIG. 4. Like the voltage regulator of FIG. 3, this regulator is also intended for applications having an input voltage that varies both above and below the desired output voltage. Whether the configuration of FIG. 3 is preferred over that of FIG. 5, or vice versa, depends on the relationship between desired output voltage to the input voltage range. Either configuration may be adapted to cover any desired range, but the factors above will determine which configuration is more economical.

While the invention has been described with reference to a preferred embodiment, it will be understood by those skilled in the art that various changes may be made and equivalents may be substituted for elements thereof without departing from the broader aspects of the invention. Also, it is intended that broad claims not specifying details of a particular embodiment disclosed herein as the best mode contemplated for carrying out the invention should not be limited to such details. Furthermore, while generally specific claimed details of the invention constitute important specific aspects of the invention, in appropriate instances even the specific claims involved should be construed in light of the doctrine of equivalents.

I claim:

1. An automatic AC voltage regulator for receiving an AC input voltage and maintaining an AC output voltage at a predetermined level, said regulator comprising:

a first input terminal and a second input terminal between which the input voltage is applied;

a first output terminal and a second output terminal between which the output voltage is maintained;

an auto-transformer having a first winding and a second winding;

switching means connected to said auto-transformer, said input terminals, and said output terminals, said switching means having a first position and a second position, in the first position said switching means allowing transformer action to take place between said input terminals and said output terminals, in the second position said switching means shorting out the windings of said auto-transformer such that no transformer action takes place between said input terminals and said output terminals;

sensing means for comparing the output voltage to the predetermined voltage level, said sensing means sending a signal to indicate the relationship between the output voltage and said predetermined voltage level; and control means for receiving said signal and alternately operating said switching means in response to said signal to maintain said output voltage at said predetermined level.

2. The voltage regulator of claim 1 wherein said second input terminal is connected to said second output terminal.

3. An automatic AC voltage regulator for maintaining an AC output voltage at a predetermined voltage level in response to an AC input voltage, said regulator comprising:

a first input terminal and a second input terminal between which the input voltage is applied;

a first output terminal and a second output terminal between which the output voltage is maintained, said second output terminal being connected directly to said second input terminal;

an auto-transformer having a first winding and a second winding, the secondary winding being connected in series between said first input terminal and said first output terminal;

sensing means for comparing the output voltage to the predetermined voltage level and establishing a signal proportional to the difference between them; and a switch assembly alternating between a first position and a second position in response to the signal established by said sensing means, said switch assembly connecting the first winding to said second winding in the switch assembly first position, said switch assembly connecting the first winding to said second input terminal in the switch assembly second position, said switch assembly alternating as is necessary to produce an output voltage approximately equal to the predetermined voltage level.

4. An automatic AC voltage regulator as claimed in claim 3, wherein when said switch assembly is in the second position the output produced by said auto-transformer is equal to the input voltage.

5. An automatic AC voltage regulator as claimed in claim 4, wherein when said switch assembly is in the first position the output produced by said auto-transformer is less than the input voltage.

6. An automatic AC voltage regulator as claimed in claim 4, wherein when said switch assembly is in the first position, the output produced by said auto-transformer is greater than the input voltage.

7. A voltage regulator as claimed in claim 3 wherein the predetermined voltage level may be varied by an operator.

8. A voltage regulator as claimed in claim 3 wherein said switching means comprises a first switch and a second switch, said first switch being connected between the first winding and the second winding, said second switch being connected between said auto-transformer and said output terminals, said first switch and said second switch being arranged to be energized alternately.

9. A voltage regulator as claimed in claim 8 additionally comprising an inductor connector to said auto-transformer, wherein as said first switch and said second switch are alternately energized, said inductor creates a voltage across said output terminals that is equal to a value between the voltage level produced when said first switch is energized and the voltage level produced when said second switch is energized.

10. A voltage regulator as claimed in claim 5 additionally comprising a step-up transformer having input terminals and output terminals, the input voltage being applied across said step-up transformer input terminals, said step-up transformer output terminals being connected to the input terminals of said auto-transformer.

11. A voltage regulator as claimed in claim 6 additionally comprising a step-down transformer having input terminals and output terminals, the input voltage being applied across said step-down transformer input terminals, said step-down transformer output terminals being connected to the input terminals of said auto-transformer.

12. A voltage regulator as claimed in claim 5 additionally comprising a step-up transformer having input terminals and output terminals, the step-up transformer input terminals being connected to said auto-transformer output terminals, the output voltage being maintained across the step-up transformer output terminals.

13. A voltage regulator as claimed in claim 6 additionally comprising a step-down transformer having input terminals and output terminals, the step-down transformer input terminals being connected to said auto-transformer output terminals, the output voltage being maintained across the step-down transformer output terminals.

14. A voltage regulator as claimed in claim 9 wherein said input voltage has a given frequency and said switching means alternates the connection of said input terminals and said output terminals at a frequency greater than the frequency of the input voltage.

15. An AC voltage regulator producing an AC output voltage at a predetermined desired level upon receiving an AC input voltage, said voltage regulator comprising:

input terminals across which the input voltage is applied;

output terminals across which the output voltage is maintained, said output terminals being adapted for direct connection to said input terminals;

an auto-transformer having a first winding and a second winding, said auto-transformer being adapted for connection between said input terminals and said output terminals;

switching means connected between said auto-transformer and said input terminals and between said auto-transformer and said output terminals, upon receipt of appropriate signals said switching means alternating between a first position and a second position, wherein in the first position said switching means shorts out said auto-transformer, wherein in the second position said switching means connects said input terminals and said output terminals to said auto-transformer so as to include said auto-transformer in the operation of said voltage regulator; and sensing means for comparing the output voltage to the predetermined voltage level, said sensing means sending signals to direct said switching means to alternate between the first position and the second position as is necessary to produce the predetermined voltage level.

16. A voltage regulator as claimed in claim 15 additionally comprising:

a second transformer having input terminals and output terminals, an input voltage being applied between said second transformer input terminals, said output terminals being connected to said first transformer input terminals.

17. A voltage regulator as claimed in claim 15 additionally comprising:

a starter connected to said output terminals and to said switching means, said starter monitoring the voltage output of said power supply, upon the power supply voltage output being less than a preset value said starter overriding the signals of said sensing means and sending signals to said switching means, directing said switching means to connect said input terminals directly to said output terminals.

18. An AC voltage regulator producing an AC output voltage at a predetermined level upon receiving an AC input voltage having a given frequency, said voltage regulator comprising:

input terminals across which the input voltage is applied;

output terminals across which the output voltage is maintained, said output terminals being adapted for direct connection to said input terminals;

an auto-transformer having a first winding and a second winding, said auto-transformer being adapted for connection between said input terminals and said output terminals;

switching means connected between said auto-transformer and said input terminals and between said auto-transformer and said output terminals, upon receipt of appropriate signals said switching means alternating between a first position and a second, wherein in the first position said switching means shorts out said auto-transformer, wherein in said second position said switching means connects said input terminals and said output terminals with said auto-transformer so as to include said auto-transformer in the operation of said voltage regulator;

a waveform generator producing a waveform at a frequency greater than the frequency of the input voltage, said waveform having a voltage level determined by the predetermined output level; and a comparator comparing the waveform with the output voltage, said comparator sending the appropriate signals to said switching means directing said switching means to alternate between said first position and said second position in response to the signals sent by said comparator.

19. A voltage regulator as claimed in claim 18 wherein said waveform generator produces a waveform having a frequency greater than 119 hertz.

20. A voltage regulator as claimed in claim 18 wherein said waveform generator produces as approximately triangular shaped waveform.

* * * * *